United States Patent Office 3,427,348
Patented Feb. 11, 1969

3,427,348
PREPARATION OF GLYCOLS AND GLYCOL ESTERS BY OXIDATION OF OLEFINS WITH SELENIUM DIOXIDE
Danford H. Olson, Littleton, Colo., assignor to Marathon Oil Company, Findlay, Ohio, a corporation of Ohio
No Drawing. Filed Nov. 29, 1965, Ser. No. 510,389
U.S. Cl. 260—497     11 Claims
Int. Cl. C07c 67/00; C07b 3/00

ABSTRACT OF THE DISCLOSURE

The present invention comprises a process for the oxidation of hydrocarbon olefins having from 2 to 4 carbon atoms comprising treating said olefins with selenium dioxide in the conjoint presence of mineral acid and organic acid at about 50 to about 150° C.

---

The present invention relates to the preparation of glycols, glycol esters and related products, and in particular, relates to the production of such products by treatment of olefins with selenium dioxide in the conjoint presence of a mineral acid and an organic acid.

The glycols and glycol esters of the present invention are useful as extractive solvents, organic chemical intermediates in a wide variety of reactions and the glycols, especially ethylene glycol, are well known as being useful for the lowering of the freezing point of aqueous solutions, especially as antifreeze agents in automotive radiators.

The present invention embodies the discovery that the readily available 2 through 4 carbon-atom olefins can be economically oxidized at moderate temperatures in a single step to form valuable glycols and glycol esters in the presence of selenium dioxide. It is particularly surprising that the conjoint presence of both a mineral acid and an organic acid in the reaction mixture is essential to the practice of the invention.

The reactions of the present invention proceed as follows:

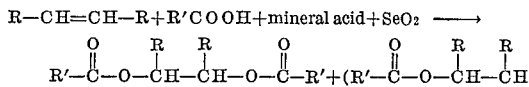

where R is selected from the group consisting of H; —CH₃;

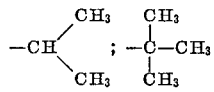

phenyl; naphthyl; methylated phenyl and naphthyl radicals; and the non-interfering (with the reactions of the present invention) derivatives thereof; where R, is selected from the group consisting of hydrogen, monovalent hydrocarbon radicals, and substituted non-interfering (with the reactions of the present invention) hydrocarbon radicals such as bromides, chlorides, and cyanides, and is preferably alkyl; where R' preferably has from 0 to about 20 and most preferably from 0 to about 6 carbon atoms; where the Rs and R's may be the same or different; and where $x$ is an integer of from 1 to about 6 and is preferably 1 or 2.

The preferred starting materials are olefins: ethylene and propylene; organic acids: acetic acid and chloroacetic acid; and mineral acids selected from the group consisting of hydrochloric acid, nitric acid, sulfuric acid, phosphoric acid and perchloric acid, and most preferably hydrochloric acid.

In most cases, it will be preferred to mix together the mineral acid, the organic acid, and the selenium dioxide and then introduce the olefin preferably in gaseous form gradually into this reaction mixture until the reaction ceases. For this reason, it is not meaningful to state the number of moles of the other starting materials to be present for each mole of reacting olefin. However, the ratio of organic to mineral acid can be varied and this ratio exerts an important controlling influence on the products obtained. In general, from 1 to about 90 and preferably from 10 to about 50 weight percent of the total acid in the reaction mixture should be organic acid. The effect on the products of varying the ratio of mineral to organic acid is illustrated in Examples II through V.

In the preferred case of ethylene, ethylene glycol diacetate is primarily produced under most reaction conditions. As would be expected, some ethylene glycol monoacetate will generally be produced by hydrolysis of the diacetate where water is present in the reaction media.

In general, it is desirable that the reaction mixture contains some water, preferably from about .01 to above about 10,000% and most preferably from 10 to about 100 mole percent based on the total moles of mineral acid and organic acid present in the reaction mixture. The production of monoacetates may be favored or limited by adding more or less water to the reaction mixture. Formation of glycols is favored by a limited amount of organic acid.

The reaction of the present invention is preferably conducted at a temperature of from about 50 to about 150° C. and most preferably at from about 100 to about 140° C. Lower temperatures render the reaction inconveniently slow although it does in general proceed. Higher temperatures can cause an interfering side reaction in which the organic acid is oxidized by the selenium dioxide to the exclusion of olefin oxidation products. In general, the optimum temperature will be dependent on the starting materials utilized and the end products desired and may be readily established by trial runs.

Pressure is not narrowly critical but will preferably be from about 0.1 to about 10,000 atmospheres, most preferably from 1 to about 10 atmospheres.

The reaction may be conducted on a flow basis or more preferably on a batch basis in conventional equipment, as for example, in a stirred autoclave. Reaction media and catalysts, while not necessary to the practice of the present invention, may be utilized where desired.

The invention will be better understood by reference to the following examples which are to be considered as being merely illustrative and as not limiting the scope of the invention in any manner.

EXAMPLE I

Ethylene at 50 p.s.i.g. is supplied to a reaction vessel containing 200 ml. acetic acid, 50 g. SeO₂ and 50 g. 36% hydrochloric acid. The reaction mixture is heated at 125° C. until absorption of ethylene ceases. The solution is then filtered to remove metallic Se and poured into 200 ml. of water and extracted with methylene chloride solution is dried and the solvent distilled off to give 65.5 g. crude product. Distillation of the crude product and recovery of the individual components yields 16.7% ethyl acetate, 2.7% ethyl alcohol, 27.3% ethylene glycol monoacetate, 38.8% ethylene glycol diacetate, 1.8% ethylene glycol and 12.6% organo selenium compounds.

EXAMPLE II THROUGH V

When ethylene is added to the reaction mixture containing 50 g. (0.455 mole) selenium dioxide together with the moles of the materials noted in Table 1, all according to the methods of Example I, the products obtained are as given in Table 1.

TABLE 1.—OXIDATION OF ETHYLENE WITH SELENIUM DIOXIDE IN THE PRESENCE OF VARIOUS ACIDS

| Example Number | Acids Present | AcOCH₂CH₂OAc | Products Obtained (Mole Percent Based on SeO₂) | | Total [1] |
|---|---|---|---|---|---|
| | | | (AcOCH₂CH₂)₂Se | (AcOCH₂CH₂)₂Se₂ | |
| 2 | Glacial HOAc | 2.44 | 35.00 | 5.93 | 43.37 |
| 3 | HOAc (5 moles), NaOAc (0.245 moles) | 0 | 39.67 | 0.64 | 40.31 |
| 4 | HOAc (5 moles), HClO₄ (0.045 moles), H₂O (0.1 moles) | 19.93 | 34.53 | 14.04 | 68.50 |
| 5 | HOAc (4.2 moles), HCl (0.5 moles), H₂O (1.8 moles) | [2] 45.16 | 3.16 | 0.65 | 99.10 |

[1] Total yield of identified products based on moles of SeO₂.  [2] In addition a 50.13 mole-percent yield of ethylene glycol monoacetate was produced.

EXAMPLE VI

Ethylene is treated with 50 g. selenium dioxide in 200 ml. of 3 N hydrochloric acid at 150° C. according to the methods of Example I. No observable reaction occurs even after several hours. However, when a small amount of acetic acid (1.0 g., 0.017 mole) is added to the reaction mixture, ethylene immediately begins to be absorbed indicating that a reaction has commenced. The reaction mixture is then neutralized with the sodium carbonate and extracted with diethyl ether. The only products recovered from the ether extract are ethylene glycol and diethylene glycol. No acetate esters are detected.

EXAMPLE VII

When propylene is reacted according to the methods of Example I, propylene glycol mono- and diacetates and allyl acetate are recovered from the product mixture.

What is claimed is:

1. A process for the oxidation of hydrocarbon olefins having from 2 to 4 carbon atoms comprising treating said olefins with selenium dioxide in the conjoint presence of mineral acid and organic acid of the formula R'COOH wherein R' is selected from the group consisting of hydrogen and alkyl, bromo-alkyl and chloro-alkyl having up to 20 carbon atoms at about 50 to about 150° C.

2. The process of claim 1 wherein the olefin comprises ethylene.

3. The process of claim 1 wherein the olefin comprises propylene.

4. The process of claim 1 wherein the olefin comprises normal butylene.

5. The process of claim 1 wherein the olefin comprises isobutylene.

6. The process of claim 1 wherein the organic acid is acetic acid.

7. The process of claim 6 wherein the mineral acid is selected from the group consisting of hydrochloric acid, nitric acid, sulfuric acid, and perchloric acid.

8. The process of claim 7 wherein the mineral acid is hydrochloric acid.

9. The process of claim 8 wherein the olefin is ethylene.

10. The process of claim 8 wherein the olefin is propylene.

11. The process of claim 8 wherein the olefin is butylene.

References Cited

UNITED STATES PATENTS 2,428,590  10/1947  Shokal et al. _____ 260—497
2,519,754  8/1950  Gresham et al. _____ 260—497

OTHER REFERENCES

Mugdan et al.: J. Chem. Soc. (London) 1949, pp. 2988–2993.

LORRAINE A. WEINBERGER, *Primary Examiner.*

V. GARNER, *Assistant Examiner.*

U.S. Cl. X.R.

260—410.6, 487, 635, 465.6

UNITED STATES PATENT OFFICE
CERTIFICATE OF CORRECTION

Patent No. 3,427,348                                                  February 11, 1969

Danford H. Olson

It is certified that error appears in the above identified patent and that said Letters Patent are hereby corrected as shown below:

Column 1, line 56, "R," should read -- R′ --. Column 2, line 59, after "chloride" insert -- . The methylene chloride --.

Signed and sealed this 31st day of March 1970.

(SEAL)
Attest:

Edward M. Fletcher, Jr.                                    WILLIAM E. SCHUYLER, JR Attesting Officer                                                        Commissioner of Patents